(12) United States Patent
Åströ et al.

(10) Patent No.: US 8,623,560 B2
(45) Date of Patent: Jan. 7, 2014

(54) METHOD AND ARRANGEMENT TO CONTROL THE HEAT BALANCE OF FUEL CELL STACKS IN A FUEL CELL SYSTEM

(71) Applicant: Wärtsilä Finland Oy, Vaasa (FI)

(72) Inventors: Kim Åströ, Kirkkonummi (FI); Tero Hottinen, Lohja (FI)

(73) Assignee: Convion Oy, Espoo (FI)

( * ) Notice: Subject to any disclaimer, the term of this patent is extended or adjusted under 35 U.S.C. 154(b) by 0 days.

(21) Appl. No.: 13/693,340

(22) Filed: Dec. 4, 2012

(65) Prior Publication Data

US 2013/0095407 A1 Apr. 18, 2013

Related U.S. Application Data

(63) Continuation of application No. PCT/FI2011/050487, filed on May 26, 2011.

(30) Foreign Application Priority Data

Jun. 4, 2010 (FI) ..................................... 20105636

(51) Int. Cl.
*H01M 8/06* (2006.01)

(52) U.S. Cl.
USPC ........... 429/408; 429/415; 429/427; 429/428; 429/429; 429/434; 429/456

(58) Field of Classification Search
USPC ......... 429/407, 408, 415, 427, 428, 429, 434, 429/456
See application file for complete search history.

(56) References Cited

U.S. PATENT DOCUMENTS

| | | | |
|---|---|---|---|
| 4,876,163 A * | 10/1989 | Reichner | 429/442 |
| 6,309,770 B1 | 10/2001 | Nagayasu et al. | |
| 2005/0058863 A1 | 3/2005 | Wang et al. | |
| 2008/0020247 A1 | 1/2008 | Valensa et al. | |
| 2008/0113246 A1* | 5/2008 | Kivisaari et al. | 429/34 |

FOREIGN PATENT DOCUMENTS

| | | |
|---|---|---|
| EP | 0948070 A1 | 10/1999 |
| JP | 11-238522 A | 8/1999 |
| JP | 2001266920 | 9/2001 |
| JP | 2004063368 | 2/2004 |

(Continued)

OTHER PUBLICATIONS

Office Action dated May 8, 2013, issued by the Japanese Patent Office in the corresponding Japanese Patent Application No. 2013-512952 and an English translation thereof. (12 pages).
International Search Report (PCT/ISA/210) issued on Oct. 5, 2011, by the European Patent Office as the International Searching Authority for International Application No. PCT/FI2011/050487.

(Continued)

*Primary Examiner* — Patrick Ryan
*Assistant Examiner* — Ben Lewis
(74) *Attorney, Agent, or Firm* — Buchanan Ingersoll & Rooney PC (57) ABSTRACT

A method to control the heat balance of fuel cell stacks in a fuel cell system, the fuel cell system including at least one fuel cell unit including fuel cell stacks, whose fuel cells include an anode side and a cathode side, as well as an electrolyte interposed therebetween, and a recuperator unit for heat exchange for preheating a supply flow of the cathode side. In the method, a desired portion is separated from the fuel exhaust flow coming from the anode side and adapted to be mixed with the cathode side exit flow before said recuperator unit. Also provided is a fuel cell system implementing the method.

18 Claims, 3 Drawing Sheets

(56) References Cited

FOREIGN PATENT DOCUMENTS

| JP | 2004-71315 A | 3/2004 |
|---|---|---|
| JP | 2005044624 | 2/2005 |
| JP | 2005203223 | 7/2005 |
| JP | 2009-301971 A | 12/2009 |
| WO | WO 2006/072652 A2 | 7/2006 |
| WO | WO 2010/044772 A1 | 4/2010 |

OTHER PUBLICATIONS

Written Opinion (PCT/ISA/237) issued on Oct. 5, 2011, by the European Patent Office as the International Searching Authority for International Application No. PCT/FI2011/050487.
Finnish Search Report issued Apr. 6, 2011 for Finnish Application No. 20105636.
Office Action dated Aug. 29, 2013 in corresponding Japanese Patent Application No. 2013-512952, and English language translation, 10 pps.

* cited by examiner

METHOD AND ARRANGEMENT TO CONTROL THE HEAT BALANCE OF FUEL CELL STACKS IN A FUEL CELL SYSTEM

RELATED APPLICATIONS

This application claims priority as a continuation application under 35 U.S.C. §120 to PCT/FI2011/050487, which was filed as an International Application on May 26, 2011 designating the U.S., and which claims priority to Finnish Application No. 20105636 filed in Finland on Jun. 4, 2010. The entire contents of these applications are hereby incorporated by reference in their entireties.

FIELD

Disclosed is a method to control the heat balance of fuel cell stacks in a fuel cell system, said fuel cell system comprising at least one fuel cell unit whose fuel cells include an anode side and a cathode side, as well as an electrolyte interposed there between, and a recuperator unit for preheating a supply flow of the cathode side. Also disclosed is a fuel cell system applying the method.

The disclosure relates to SOFC (solid oxide fuel cell) type fuel cell systems, for example, in which a generally employed material component is nickel.

BACKGROUND INFORMATION

With regard to heat balance of SOFC type fuel cell systems, one problem is a rather intensive variation that takes place in the heat generation during their life period. In the early stages of their service time, heat generation is limited. As the degradation of the stacks eventually proceeds, however, the electrical efficiency deteriorates thus leading to an increase in heat generation while the production of electricity tends to decrease.

In addition, with the development of current stack performance, the area specific resistance (ASR) of the stacks can decrease. The electrical efficiency can increase with a decreasing cost of heat generation in the stacks. In high temperature fuel cell systems, such as SOFC, there are in terms of overall heat balance notable heat losses to the surroundings due to practical mechanical and cost reasons.

In the early stages of a life time of the stacks, when their electrical efficiency lies at the top and the heat generation is at minimum, the heat energy contained in the exiting hot air flow from the stacks is not necessarily adequate to sufficiently warm up the supply air flow entering the stacks. The supply air flow is heated by a heat exchanger, so called recuperative unit, in which the secondary flow is in form of the exit flow from the cathode side.

The exiting air flow from the cathode side of the stacks is not warm enough. The temperature difference dT in the heat exchange unit for a sufficient supply air warm up would have to be set extreme small. This would result in heat exchange areas that are out of proportion, i.e., the use of oversized heat exchange units.

Once the degradation of the stacks proceeds along their service life and the heat generation increases, the heat energy contained in the exit air starts to cover up the requirement set up by the supply air preheating and the supply temperature on the cathode side is gained with more ease.

However, as a result of the impaired electric efficiency of the stacks, the amount of supply air to the cathode side needs to be raised, for example, even up to quadruple in relation to a stoichiometric burning. This is in order to maintain constant electric power generation even when the service life of the stacks is getting close to its end.

This, in turn, has as an inevitable consequence of a series of further drawbacks. First of all, an increase on the supply air flow increases the internal energy consumption for supplying the air, thus reducing output power and efficiency. This further boosts the voltage drop caused by the degradation phenomena. This, in turn, means substantial descent of the electric efficiency of the system. Since it can be desirable to maintain the total power of system as constant as possible, the compensation of the descending efficiency by increased fuel supply together with boosted supply air flow, is ensued by a considerable increase on heat generation by the stacks. In addition, in light of the increase on supply flow rate, pressure losses increase as well. This can have a negative impact on the electric efficiency of the system. An inevitable vicious circle can occur as the very end of the service life of the stacks draws closer.

To compensate for heat losses and varying heat generation, there are a few methods that can be used. For example, one method is to decrease the flow rate of the supply air flow, for example, at early stages of service life of the fuel cells. Another possibility is to increase an external reforming rate. These methods have, unfortunately, their own limitations. The air flow cannot be decreased unrestrictedly since there are rather strict limitations on the oxygen utilization rates allowed by the stacks. On the other hand, an active control of external reforming is difficult accomplish without increasing the complexity of process topology.

In addition, US 2008/0020247 A1 discloses promoting preheating of air to cathode side of the fuel cell. The system is presented schematically in FIG. 1.

Figure 1:
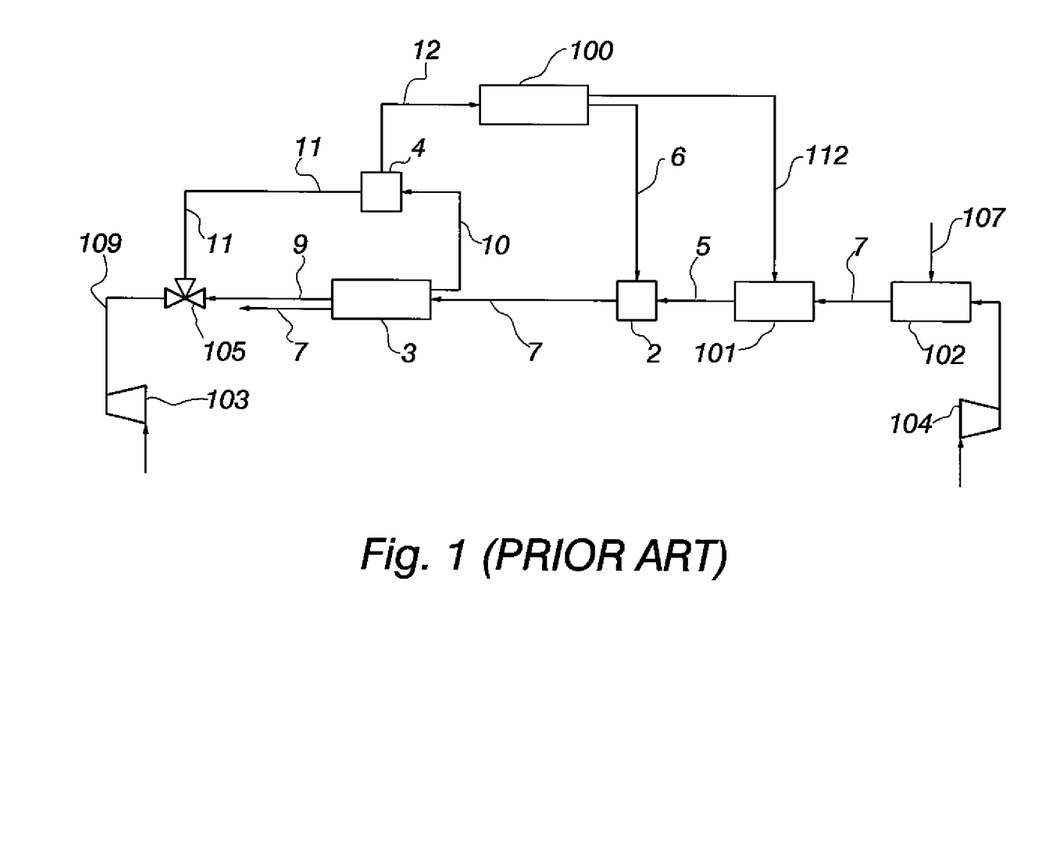
FIG. 1 shows a schematic view of an arrangement according to prior art.

The heating of the supply air 12 to the cathode side of the fuel cell unit 100 is based on utilizing the heat energy gained by the afterburner 101. For this purpose, there is arranged a special recuperator unit including mixers 2 and 4 as well as heat exchanger 3. The exit streams 5, 6 from anode and cathode side are first mixed therein in mixer 2. The evoked stream 7 is then utilized for warming up fresh cold supply air 9.

The final temperature adjustment of the supply stream 12 to the stacks 100 takes place not until after this stage. For this purpose, an air by-pass 11 is arranged. The by-pass air is mixed together with the heated air 10 in mixer 4. The adjustment of the supply temperature to the cathode side is carried out by regulating the amount of cold air 10 mixed with the warm air 11. In other words, the supply air of the cathode side is first heated up over the set target temperature and then leveled down to the set value with the help of the cold air.

This system can create problems such as increased complexity, use of an additional heat exchanger unit as well as increased demand for piping within an already cramped layout.

However, a drawback is caused by the fact that, since the temperature adjustment of the supply air on the cathode side is based on controlling the amount of extra cold air, the total mass flow of the air stream varies at a rather notable range. This makes it very difficult to control the total supply air flow entering the cathode side.

It also becomes difficult to make adjustments in favor of adapting the system to the degradation phenomena. Eventually, the above explained problems related to oversized heat exchangers and excessive piping are experienced again. In addition, the complex system and increased piping lead to further increase in pressure losses and generally inefficient functioning of the whole system.

Still another disadvantage relates to the fact that in case the afterburning stage is entirely performed prior to the recuperator unit, firstly humidity is increased, and secondly, the ascended temperature levels (for example, above 1000° C.) set high requirements on materials, i.e., the expenses for the materials would be unreasonable.

SUMMARY

In accordance with an exemplary aspect, it can be desirable to provide a flexible heat balance control and compensation method in different life points of the systems as stacks degrade, i.e., their ASR increase causing a significant increase in heat production. In accordance with an exemplary aspect, it can be desirable to maintain the heat balance within both the fuel cells and fuel cell stacks as well as within the vicinity of the fuel cell units including the related heat exchange units, despite the amount of internal heat production.

In accordance with an exemplary aspect, disclosed is a method to control a heat balance of fuel cell stacks in a fuel cell system, said fuel cell system including at least one fuel cell unit comprising fuel cell stacks, whose fuel cells include an anode side and a cathode side, as well as an electrolyte interposed therebetween, the method comprising separating a desired portion from a fuel exhaust flow of the anode side, and supplying the desired portion into a fuel stack compartment surrounding the fuel cell units.

In accordance with an exemplary aspect, disclosed is a heat balance control system of fuel cell stacks in a fuel cell system, said fuel cell system including at least one fuel cell unit comprising fuel cell stacks, whose fuel cells include an anode side and a cathode side, as well as an electrolyte interposed therebetween, the heat balance control system comprising an arrangement wherein a desired portion has been adapted to be separated from a fuel exhaust flow of the anode side and to be supplied into a fuel stack compartment surrounding the fuel cells.

BRIEF DESCRIPTION OF THE DRAWINGS

The disclosure will now be described in more detail with reference to the accompanying drawings, in which.

DETAILED DESCRIPTION

According to an exemplary aspect, provided is a solution by which the above-mentioned problems can be alleviated or completely eliminated. An exemplary method and an exemplary fuel cell system implementing the method are provided.

According to an exemplary aspect, a desired portion of the used fuel stream exiting the anode side is bled from the main stream, and further, oxidized by the cathode exit flow to produce extra heat for further use.

For example, disclosed is a process topology that allows partial burning of spent fuel specifically before the actual afterburner in the system. When a small fraction of the depleted fuel from the stack exhaust is burned within the cathode side exit flow, a substantial increase on temperature is gained. In an exemplary embodiment, only a small part of the total exit flow from the anode side is separated from the main flow, and this is performed prior to the recuperator unit.

The separated substream bled from the main flow can be guided straight back to the stack compartment. In this case, it is oxidized outside the fuel cell, i.e., between the fuel cell stacks and the outer wall of the stack compartment. This is also where all the fuel that may leak out of the stacks, is oxidized.

A suitable space can easily be arranged or chosen for this purpose. Additional structures for this purpose can, for example, be avoided. The separated fuel can be oxidized within the cathode side exit flow outside the stack compartment itself. For example, the fuel portion divided from the main exit residue fuel flow can be guided into the cathode side exit line and mixed and oxidized therewith thus increasing the temperature prior to the recuperator unit.

According to an exemplary embodiment, the bled fuel is further guided into the stack compartment and the flue gases from this burning are guided together with the exit flow from the cathode side to the recuperator unit and further out of the whole system. This exemplary embodiment can provide an extra benefit in that the heat energy gained by burning part of the used fuel can now be directed at the stacks in an efficient manner. Temperature increase also takes place in the outlet fuel flow compensating the heat losses through the structures of the stack compartment that is lost within the mentioned process flows. In addition, the burning within the stack compartment offers a possibility to boost the preheating of supply stream on the cathode side thanks to the substantially increased exit temperature of the exit flow on cathode side.

An exemplary embodiment provides a way to improve the heat balance of fuel cell systems in case of retrofitting. For example, just one single line joining anode side exit line and cathode side exit line together with appropriate control means can be sufficient. In addition, since the oxidation takes place outside the stack compartment and the fuel is continuously flushed out of the whole system, risks related to possible self-ignition of fuel around the self-ignition temperature level, for instance during start-up, can be reduced or prevented.

An exemplary embodiment can be employed, for example, even if this kind of assembly eventually leads to further increase in water content in the exit flow from the cathode side. This can have an impact on requirements concerning materials, especially as it comes to the recuperator unit. However, it has been discovered that despite any increased risk for material-related problems, an exemplary embodiment can offer better means for controlling the overall heat balance of the whole system and better usability thereof throughout its service life.

Disclosed is an effective means for adjusting the overall heat balance of the system due to the increasing heat generation resulting from the degradation of the fuel cells. Exemplary benefits are discussed below.

For example, since during early stages of the service life the additional heat generation is taken specifically from spent fuel, this does not affect the electrical efficiency of the system. For example, since the fuel is not taken from the stack inlet, it does not have any effect on the fresh fuel utilization and as the anode recirculation composition does not change, the recirculation is not affected either. For example, the only place where the change is seen in the process is the afterburner which now receives less fuel and hence less heat is generated at that location.

For example, the amount of fuel divided from the main fuel residue flow exiting the anode side can be adjusted and controlled in an active manner. The adjustment performance itself can be carried out in a straightforward manner. The amount of fuel is separated from the main fuel flow exiting the anode side such that the temperatures, for example, the one of the cathode side supply air flow exiting the recuperator unit, are maintained at desired levels and the heat balances are stabilized in a reliable manner. The increase in the heat generation due to the degradation of the fuel cells can thus be effectively compensated by reducing the bled residue fuel flow back to the stacks.

An exemplary benefit is that it makes it possible to use a substantially constant air mass flow throughout the service life of the stacks. For example, the mass flow of supply air in a fuel cell can account for about $\lambda=4$, when compared to stoichiometric burning. This means that about a quarter of the total amount of oxygen contained in the supply air entering the fuel cell is actually used in fuel cell reactions while the residue oxygen, that is to say air, is directed out of the system.

For example, the supply flow of the cathode side can be maintained even totally constant while the degree of the degradation is totally disregarded. However, exemplary methods and systems do not necessarily require a constant supply flow. The disclosure simply can provide an excellent extra degree of freedom to control the whole system regardless of the degree of degradation and consequences thereof.

Due to the substantially stabilized air streams, it can be easier to bring the recuperator unit in correspondence with its initial dimensioning. Undesirable overdimensioning is not necessary.

Other dimensioning problems as described above both in terms of heat exchange areas and stream piping can be reduced or avoided as well. For example, another exemplary advantage is that the extra heat exchange unit after the afterburner can be avoided. A further exemplary benefit is that a separate air bypass for temperature control can be eliminated if it is not otherwise desired.

An exemplary benefit in comparison with US 2008/0020247 A1 mentioned above, is the absolute reduction of temperature and humidity related stress on the recuperator unit. For example, due to restrained temperatures and lowered moisture content of the gases flowing through when compared to US 2008/0020247 A1, notable cost savings can be attained related to both construction and maintenance of the recuperator unit.

Figures 2, 2A:
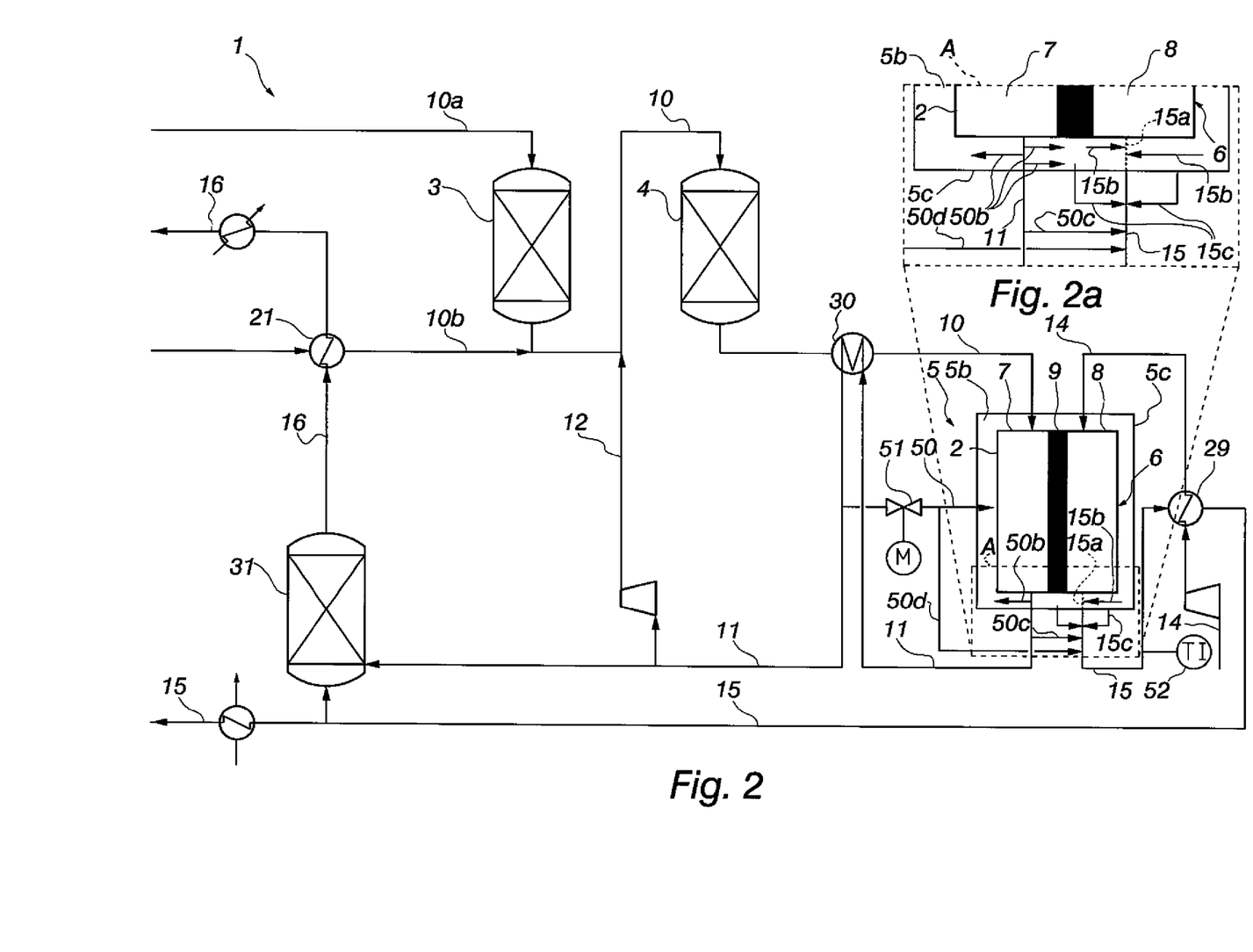
FIG. 2 shows a schematic view of an arrangement according to an exemplary embodiment, wherein a portion of the exhaust gas from anode side is redirected into the fuel cell compartment and oxidized therein.
FIG. 2a shows a close-up view of area A of FIG. 2, which is a schematic view of an exemplary embodiment, wherein a portion of the exhaust gas from anode side is bled directly inside the fuel cell compartment.

FIG. 2 shows an exemplary fuel cell system 1 in a schematic view. A fuel cell unit 5, included therein, comprises one or more fuel cell stacks 6, including successively series-connected fuel cells 2, featuring an anode side 7, a cathode side 8 and an electrolyte 9 provided therebetween, as well as a connecting plate, a so-called interconnect, set between individual fuel cells (not shown). For the sake of clarity, FIG. 2 only shows just one fuel cell stack 6 of the fuel cell unit 5 in the form of a single fuel cell 2. The number of fuel cell stacks is, of course, not limited by any means to a certain value. Multiple units or a single unit can be used.

The anode side 7 refers generally both to anode electrodes included in the fuel cells 2 of the fuel cell units 5 and, from the perspective of fuel, to components for conducting the fuel within the confines of the fuel cell units 5 to the anodes of actual individual fuel cells and to components for further conducting the gases away from the anodes. Respectively, the cathode side 8 refers to cathodes, as well as to components provided for conducting air to and from the cathodes within the confines of the fuel cell units 5.

In addition, for feeding fuel gas, the anode side 7 is provided with supply means, represented here solely by a supply line 10. In FIG. 2, the fuel enters the system 1 through line 10a and goes here first into a desulfurizer 3. Together with possible recycled fuel in line 12 as wells as steam coming from line 10b, the established flow enters next a prereformer 4 or the like, or a fuel pretreatment device.

There are provided means for discharge the fuel cell unit of spent fuel gas outgoing from the anode side 7. Here, these are represented by a discharge line 11. There may be a plurality of such discharge lines. The exit flow 11 is then guided via heat exchanger means 30 to heat up the entering supply fuel in line 10. Part of the fuel is recycled through line 12 while the rest is led to an afterburner 31. The heat thereof is used among others for producing steam in unit 21 which is directed into line 10b to be used in the prereformer 4.

On the cathode side, air is supplied through line 14, which is then divided to be delivered to fuel cell stacks 6 and further to individual fuel cells 2. Correspondingly, the air coming from the fuel cells 2 composing thereby an exit flow 15 further exits the fuel stack compartment 5c and is guided thereafter to flow via a recuperator unit 29 to heat up the supply air flow 14. In FIG. 2, the piping is presented just by a single line for the sake of clarity. Various possibilities to guide the exit flow from the stacks and to arrange a suitable piping or alike for this purpose is illustrated by a dashed line 15a between the stacks 6 and the outer wall or shell 5c of the stack compartment.

An exemplary embodiment is presented in FIG. 2. There is provided a bleeding from fuel exhaust line 11, i.e., partially used fuel. In this embodiment, the bleeding itself is not accomplished directly within the stack compartment 5c. Instead, the bleeding takes place after the heat exchange between the supply line 10 and discharge line 11 of the anode side 7. This is thus a later point in the fuel exhaust line 11. In an exemplary embodiment, a desired portion of the fuel, which itself can be advantageously adjusted, is separated and the separated fuel stream 50 is re-routed back into the surroundings 5b within the fuel cell compartment 5c. This portion can be dependent, for example, on both stack condition and load rate. The temperature values measured, for example, by means 52 can also be used in the determination of the amount of residual fuel to be separated from the exit flow 11. Once the fuel stream has entered the hot volume 5b of fuel cell compartment, it can be oxidized instantly.

In addition, since the separation of the divided portion of the fuel stream from the fuel exhaust line 11 takes place at a rather low temperature level (for example, in the range of between 100 to 400° C.), a cost-effective use of a regulating element 51 such as a standard type valve is made possible. This provides an easily implementable, reliable and accurately controllable control of the bleeding for the purpose of heat balance adjustment and makes it, thus, a cost-effective exemplary embodiment.

For example, the term 'recuperator' for unit 29 can be replaced by heat exchanger. Any heat exchange equipment suitable for heat exchange participated by the cathode side supply flow can be employed. The utilized heat energy for preheating can originate also from other sources than just the exit flow 15 of the cathode side 8. Recuperation procedure can encompass heat exchange activities outside the stack compartment 5c for substantial preheating of at least part of the supply flow 14 of the cathode side 8. Some other minor measures before and/or after the recuperator unit 29 are, however, possible.

An exemplary embodiment includes a desirable arrangement for securing a correct flow direction of the fuel that is bled from the anode side. For example, the bleeding can be arranged such that the pressure difference between anode side and cathode side around the bleeding point is positive. For example, the higher pressure on the anode side ensures that the fuel flows towards lower pressure level on the cathode side.

The pressure difference can be above 5 mbar, for example, within a range of 10-50 mbar. Exemplary aspects are not limited to such ranges. Much higher values can be acceptable as well, and basically any positive pressure difference is adequate for the purpose. The management of the pressure difference can be arranged either within the very surroundings of the bleeding point or at larger scale within the various units, compartments and/or flow loops of the fuel cell system.

The flow direction can also be assured by suitable means, such as valves or gates, to prevent any flow occurring in opposite direction. The intended degree of the fuel flow can also be boosted with suitable means to create or boost a forced flow like feeders or blasters of suitable type.

The arrangement is by no means limited to the immediately above described exemplary embodiment. The exemplary embodiment described herein exemplifies principles in a simplified manner and construction.

There are other possible arrangements that can be implemented. For example, an exemplary embodiment comprises an oxidation of the bled fuel taking place expressly outside the stack compartment 5c. The fuel stream is divided from the anode side exit flow 11, and instead of mixing it with the cathode side exit flow within the stack compartment, the mixing takes place specifically outside the stack compartment within the cathode side exit piping line 15, prior to the recuperator 29. The mixing can be adapted to be carried out such that any flame formation from the fuel oxidation will not occur within the recuperator 29. For example, the oxidation reaction can take place substantially before the recuperator such that the heat generated therein is more or less scattered to the whole flow 15. The burning itself can be accomplished by suitable means for burning, heat protection and flame control within the piping line 15 of the cathode side exit flow.

Figure 3:
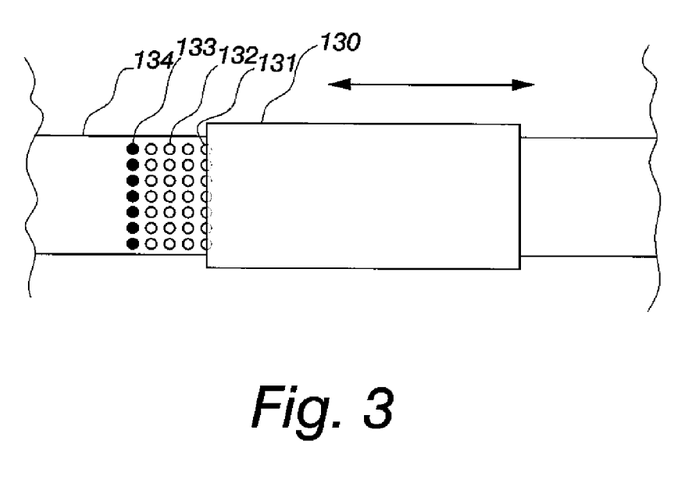
FIG. 3 shows a close-up view of a section of a residue fuel line stack compartment including means for bleeding, according to an exemplary embodiment.

It is also possible to perform the bleeding of fuel directly from the stack fuel outlet piping 11 within the volume 5c inside the stack compartment 5b as shown by lines 50b. This can be accomplished for instance with properly sized holes drilled into the piping as illustrated in FIG. 3. The desired heat balance adjustment can be taken care by air flow and the amount of holes 132 can be reduced during service break when the adjustment window of air flow is getting too narrow.

The way the cathode side exit flow 15 is established within the stack compartment 5c is not restricted. It is possible to let the exit air stream out of the fuel cells 2 and then guide it out from the compartment 5c either via one single exit line 15 or via several lines which then can be connected together as shown by lines 15c. The exit air can also be lead in a more controlled manner via suitable ducts 15b arranged to fuel cell stacks which can be joined together either within the stack compartment 5c or outside the compartment. The degrees of freedom on how to arrange the routing of cathode side exit flow 15, 15b, 15c can be numerous depending on the means for mixing the bled fuel to the exit air flow 15.

For example, an exemplary embodiment comprises a more or less all-embracing spooling of the stacks by the exit air from fuel cells. For example, the exit air is allowed to flow freely to spool the whole stack compartment space 5b prior to exiting through discharge openings arranged for this purpose. For example, once the fuel has been bled from the anode side 7, no matter whether this takes place outside or inside the stack compartment 5c, an efficient and guaranteed oxidation and spooling of the fuel can be assured by the exit air flow from the cathode side 8 in the vicinity around the stacks 5 within the space 5b of the compartment 5c. And further, this specifically takes place prior to exit from the compartment 5c. For example, any accumulation of unoxidized fuel is excluded.

An exemplary embodiment can provide an advantage in that once the bled fuel is mixed with the exit air of the cathode side specifically outside the stack compartment, for example, within the piping line 15 prior to recuperator unit 29, an advantage is gained in that a need for spooling in the stack compartment can be avoided. A leaking phenomenon of fuel that can take place in the fuel cell themselves, may still exist and can be managed. However, since the temperature levels can be safely above the self-ignition point, any spooling need of fuel is diminished by an instant oxidation by the cathode side exit air. While the fuel is finally mixed with the exit air, for example, alongside with the exit flow piping line 15, the exit flow 15 itself can assure an adequate spooling effect.

Another possible alternative to arrange the bleeding of the fuel is similar to a previously described exemplary embodiment. In this case, the bleeding 50b is controllable in a more continuous manner. This can be carried out with a hot "valve"-element 51 connected to the fuel outlet line 11 within the compartment 5c. This embodiment allows direct and active controllability of the heat balance without any need of modifying fixed bleeding holes during the lifetime of the stacks.

The control of the amount of bled fuel can be carried out by any suitable methods that are applicable for adjusting mass flow of a separated flow from main flow. A few of examples are presented in FIG. 3. There are cylindrical control means 130, which closes/opens exit openings 132 as needed or adjusts the size of the open portion 131 of the openings. The cylindrical control means can be arranged substantially in a gas tight or pressure tight manner around line 134 (corresponds to 11). In an exemplary embodiment, one or more of the openings can be arranged to be sealed 133, if desired. Various valve type means can be used as well.

In an exemplary embodiment, the bleeding can be performed at least in part outside the stack compartment 5c prior to heat exchanger 30, thus reducing the temperature level in the surroundings of the means for bleeding. This exemplary embodiment is depicted by route 50c in FIGS. 2 and 2a. Also, a back up can be arranged for valid pressure difference and/or correct flow direction between anode and cathode side. Means for assuring a proper feed of the fuel as well as a safe flow control can be employed if desired, and are not shown.

In an exemplary embodiment, the fuel is bled after the heat exchanger 30 according to line 50 in FIG. 2. However, instead of feeding the fuel back to the stack compartment, the fuel can be guided through line 50d directly to exit flow line 15 and mixed therein. In this case, any measurements within the stack compartment can be avoided. A simple and low cost implementation can be achieved. Any of the exemplary embodiments can be combined with each other in a suitable manner.

In an exemplary embodiment, the heat transfer of the heat energy gained by burning the separated fuel residue can be arranged to be of a type direct in the fuel cell stack compartment. At the same time, various temperature differences within the compartment can by reduced.

due to the effective warming of the stacks, the arrangement can make it possible to perform a boosted final warm up of the system up to normal operation temperature. Once an acceptable temperature level has been reached in terms of self-ignition, for example, in a range between 500 to 600° C., and the fuel supply to the fuel cells has been started thereafter, the bleeding of the residue fuel flow can also be started. By boosting the warm up of the fuel cell stacks with the help of fuel residue burning, it is possible to gain substantial shortening in the warm up time of the final warm up stage. For example, time savings even up to 40% are possible.

According to an exemplary embodiment, the start up can be boosted by using the above-described fuel residue burning also below the self-ignition temperature. The burning can be performed either inside or outside the stack compartment, depending on what ever arrangement is used. When operating below the self-ignition temperature, it can be desirable to use suitable means for guarding the flame to prevent flame extinction. Once the flame gas has been established, the heat from the burning can prevent flame-out. An exemplary benefit is that by using fuel from the very beginning of the start up, a possibility arises to avoid need for other means for warming of streams and components, such as electrical heaters for instance.

An exemplary arrangement is also most flexible in terms of both degree of capacity utilization and operation time. The arrangement can be used, for example, only when it is desired, such as in the early stages of the service life of the system, when the heat generation is otherwise inadequate. On the other hand it can be used at final stage of the service life for shortening the warm up time.

Another exemplary benefit is by using an exemplary arrangement, the size of the recuperator can be reduced significantly. While the heat flow from the fuel cell units can be less significant at the beginning, the shortage can be compensated by increasing the secondary burning of the residue fuel within the stack compartment. In this way, the oversized dimensioning of the recuperator can be reduced or avoided. Later on, when the degradation leads to increased heat generation, the burning can be closed down as the recuperator becomes capable of warming the supply air in a sufficient manner.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method to control a heat balance of fuel cell stacks in a fuel cell system, said fuel cell system including at least one fuel cell unit comprising fuel cell stacks, whose fuel cells include an anode side and a cathode side, as well as an electrolyte interposed therebetween, the method comprising separating a desired portion from a fuel exhaust flow of the anode side, and supplying the desired portion into a fuel stack compartment surrounding the fuel cell units.

2. The method according to claim 1, wherein the portion separated from the fuel exhaust flow of the anode side is adapted to be mixed with the cathode side exit flow before a recuperator unit arranged for preheating a supply flow of the cathode side.

3. The method according to claim 1, wherein said portion lies between 0-50%, based on the fuel exhaust flow of the anode side.

4. The method according to claim 1, wherein the separation of the portion from of the fuel exhaust flow is accomplished after heat exchange arranged between said exhaust flow and a fuel supply flow entering the anode side of the fuel cells.

5. The method according to claim 1, wherein at least a part of the portion is bled from the stack fuel outlet flow already within the stack compartment that surrounds the fuel cells.

6. The method according to claim 5, wherein the bleeding is accomplished in the stack compartment by a device arranged to the piping of the fuel exhaust flow.

7. The method according to claim 1, wherein a control of the bleeding is accomplished by using an active control of a pressure on the anode side.

8. The method according to claim 1, wherein said portion lies between 0-15%, based on the fuel exhaust flow of the anode side.

9. The method according to claim 1, wherein said portion lies between 0-12%, based on the fuel exhaust flow of the anode side.

10. A heat balance control system of fuel cell stacks in a fuel cell system, said fuel cell system including at least one fuel cell unit comprising fuel cell stacks, whose fuel cells include an anode side and a cathode side, as well as an electrolyte interposed therebetween, the heat balance control system comprising an arrangement wherein a desired portion has been adapted to be separated from a fuel exhaust flow of the anode side and to be supplied into a fuel stack compartment surrounding the fuel cells.

11. The system according to claim 10, wherein the portion separated from the fuel exhaust flow of the anode side has been adapted to be mixed with the cathode side exit flow prior to entering a recuperator unit arranged for preheating a supply flow of the cathode side.

12. The system according to claim 10, wherein said portion lies between 0-50%, based on the fuel exhaust flow of the anode side.

13. The system according to claim 10, wherein the separation of the portion from of the fuel exhaust flow has been adapted to be accomplished after heat exchange arranged between said exhaust flow and a fuel supply flow entering the anode side of the fuel cells.

14. The system according to claim 10, wherein at least a part of the portion has been adapted to be bled from the stack fuel outlet flow already in the stack compartment that surrounds the fuel cells.

15. The system according to claim 14, wherein the bleeding has been accomplished in the stack compartment by a device arranged to the piping of the said fuel exhaust flow.

16. The system according to claim 10, wherein the control of the bleeding has been accomplished by using an active control of a pressure on the anode side.

17. The system according to claim 10, wherein said portion lies between 0-15%, based on the fuel exhaust flow of the anode side.

18. The system according to claim 10, wherein said portion lies between 0-12%, based on the fuel exhaust flow of the anode side.

* * * * *

UNITED STATES PATENT AND TRADEMARK OFFICE
CERTIFICATE OF CORRECTION

PATENT NO. : 8,623,560 B2  
APPLICATION NO. : 13/693340  
DATED : January 7, 2014  
INVENTOR(S) : Kim Åström et al.

Page 1 of 1

It is certified that error appears in the above-identified patent and that said Letters Patent is hereby corrected as shown below:

Title Page, Item (12): change "Åströ et al." to --Åström et al.--.

Title Page, Item (72) Inventors: change "Kim Åströ" to --Kim Åström--.

Signed and Sealed this  
Fifteenth Day of April, 2014

Michelle K. Lee  
*Deputy Director of the United States Patent and Trademark Office*